Aug. 14, 1956
J. G. CHAFFEE
2,759,182
DIRECTIVE ANTENNA SYSTEMS
Filed March 24, 1945
5 Sheets-Sheet 1
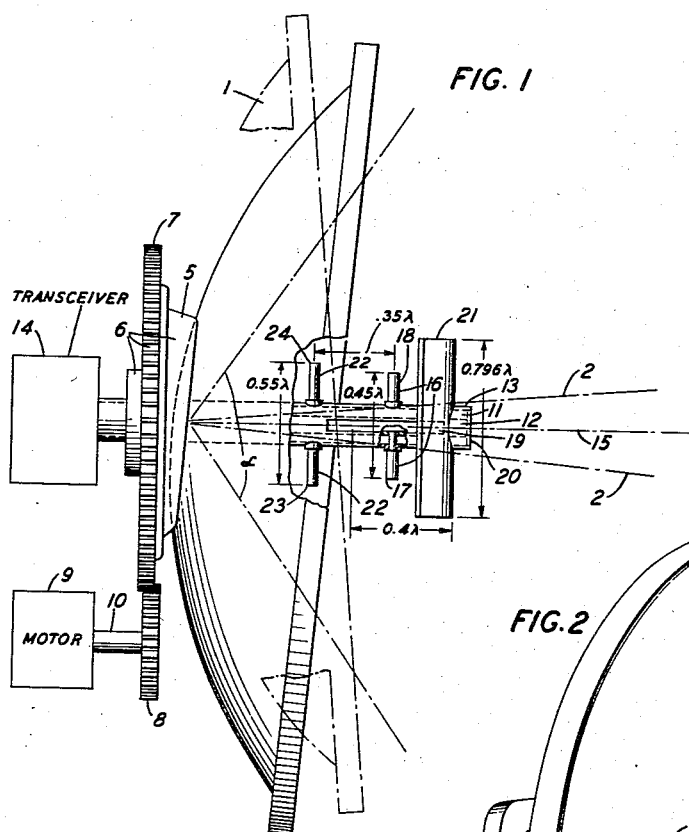
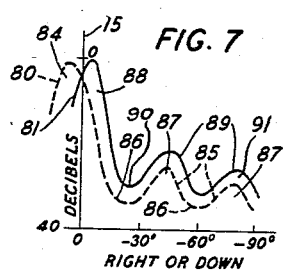
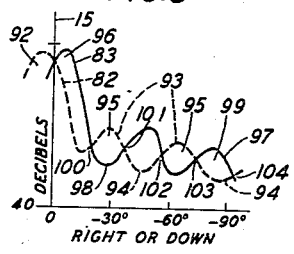
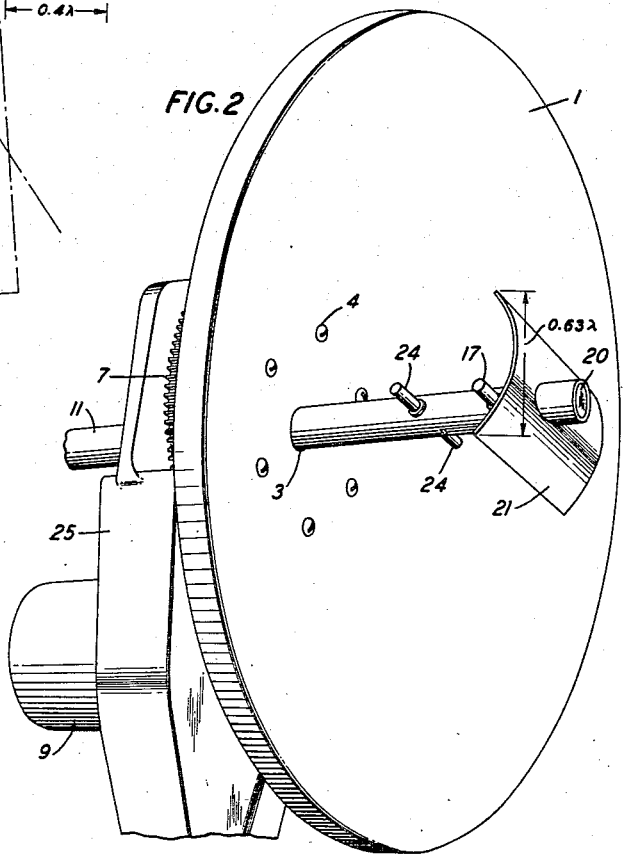
INVENTOR
J. G. CHAFFEE
BY A. J. Zerbarini
ATTORNEY

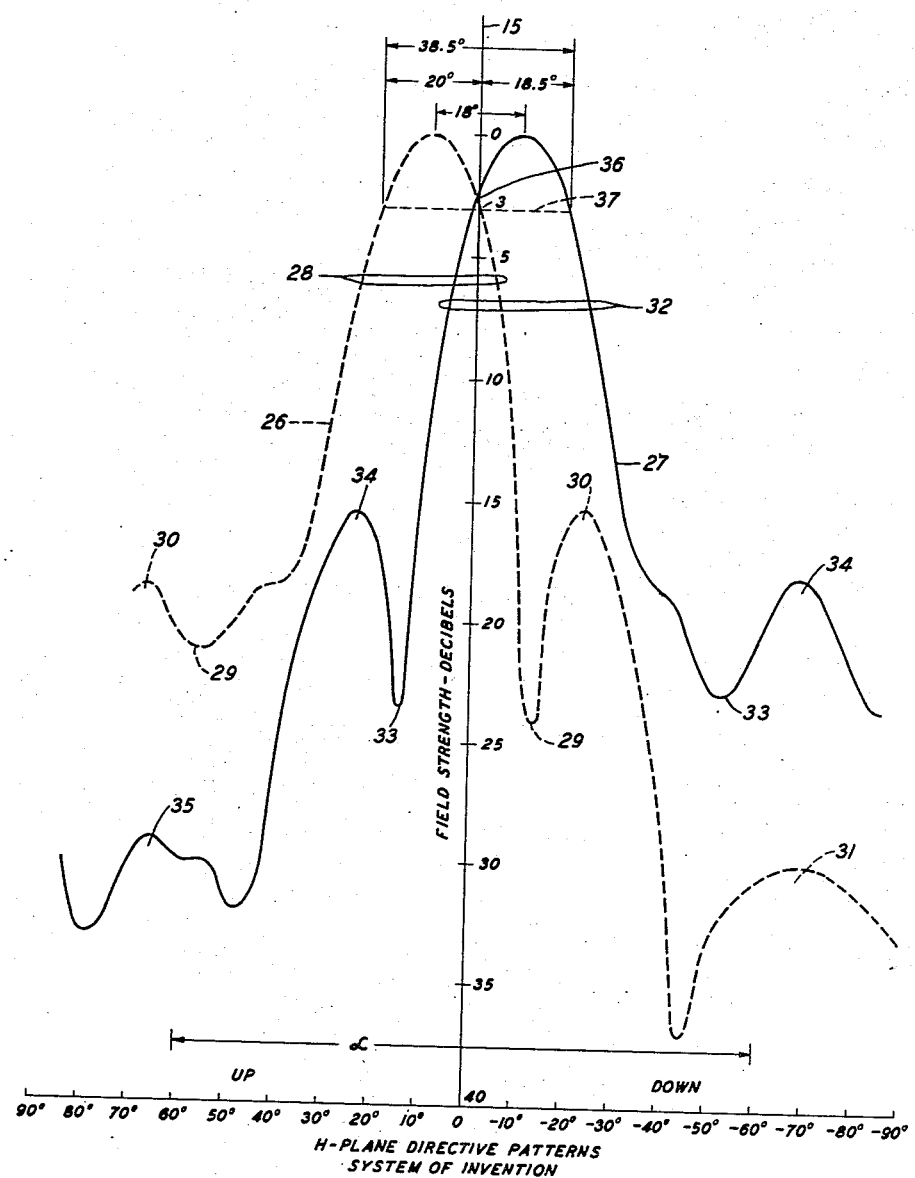

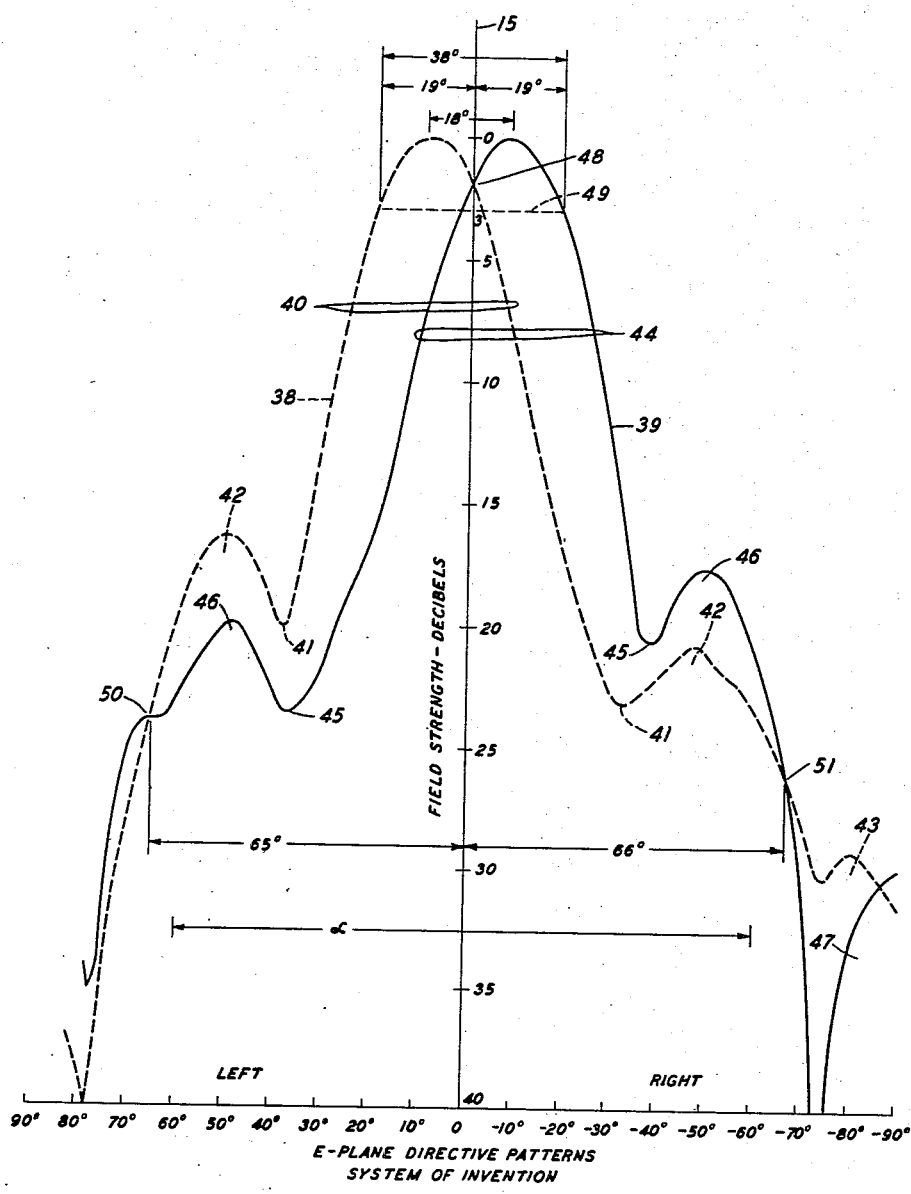

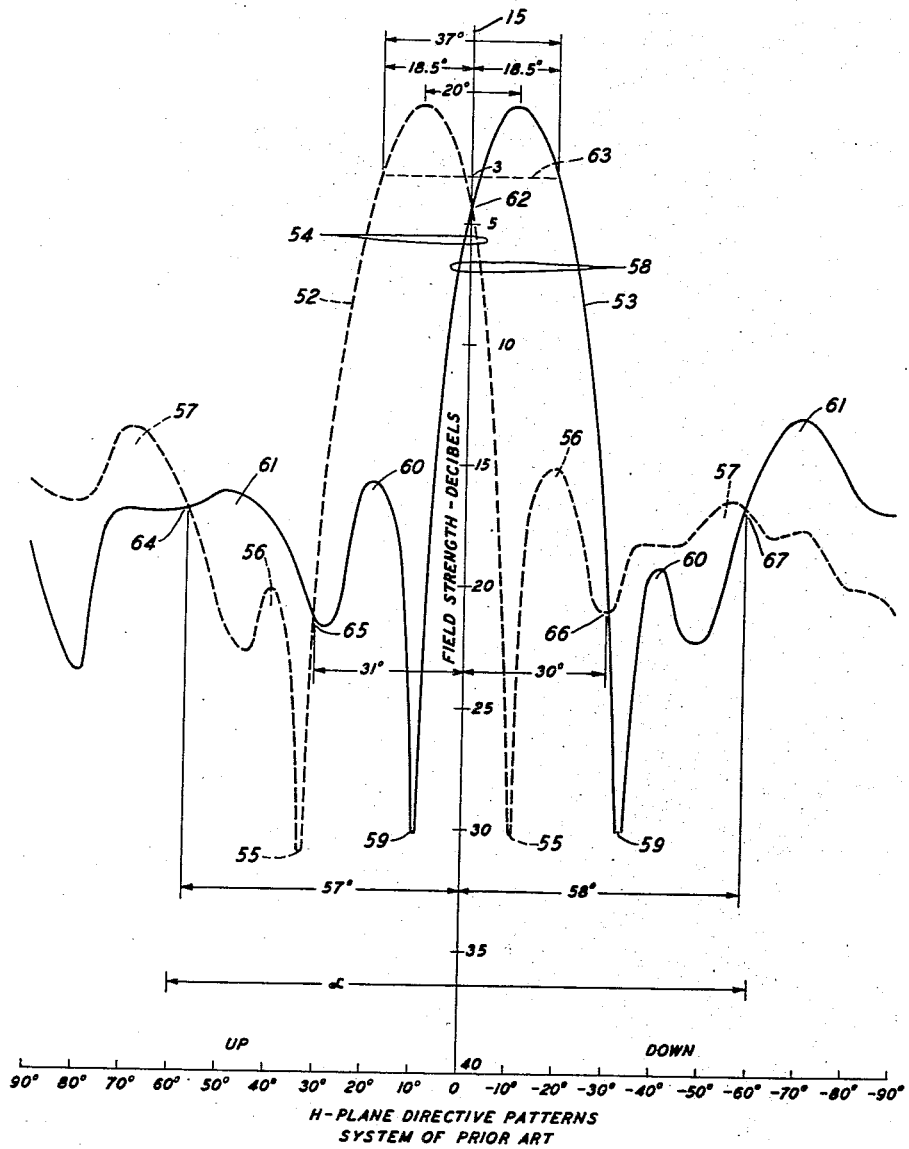

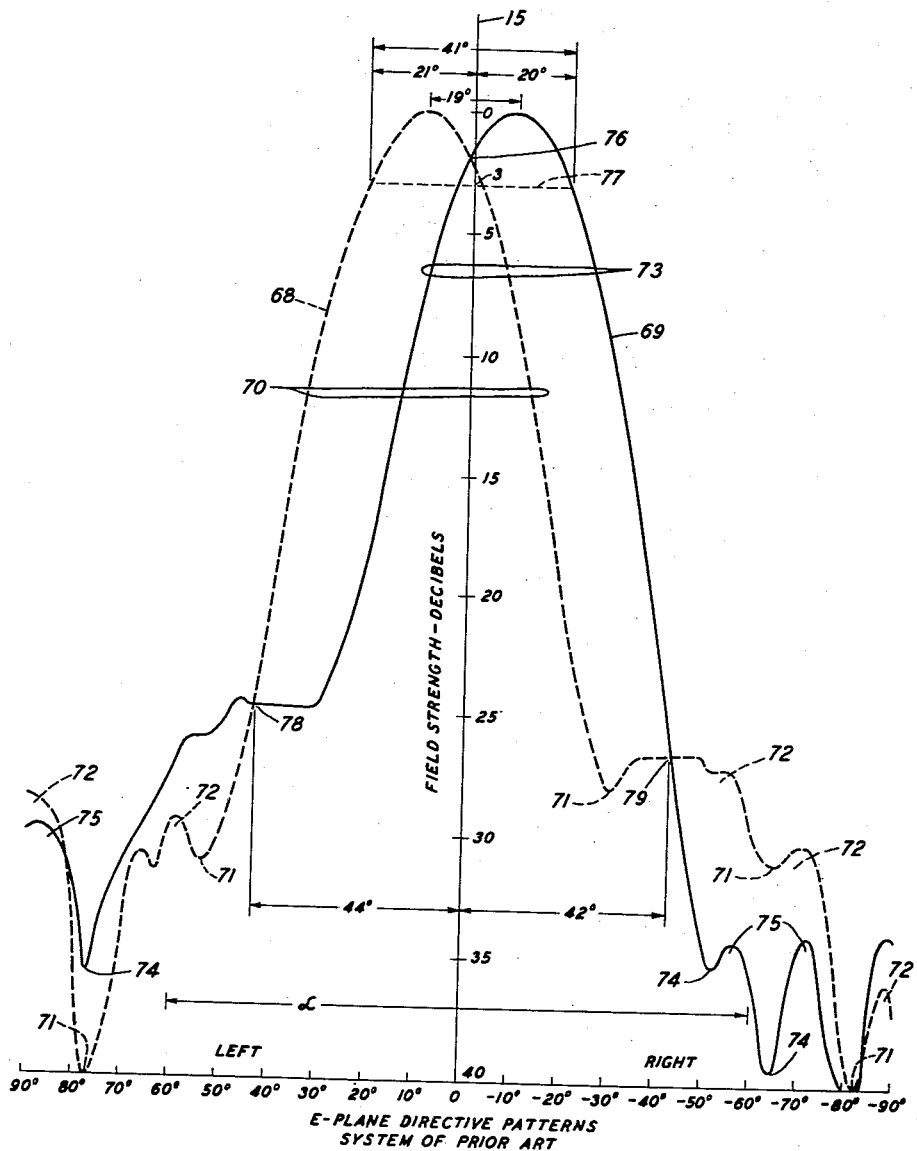

United States Patent Office 2,759,182
Patented Aug. 14, 1956

2,759,182

DIRECTIVE ANTENNA SYSTEMS

Joseph G. Chaffee, Hackensack, N. J., assignor to Bell Telephone Laboratories, Incorporated, New York, N. Y., a corporation of New York Application March 24, 1945, Serial No. 584,531

3 Claims. (Cl. 343—838)

This invention relates to directive antenna systems and particularly to microwave lobe switching and conical scanning directive antenna systems.

As is known, at least two types of dual-plane lobe switching, or conical scanning, antenna systems have been suggested for use in radar systems for ascertaining the direction of a target. One type, hereinafter termed for convenience the "small-angle" type, is utilized in an anti-aircraft, ship or ground radar system for tracking a fast moving target, such as enemy aircraft. The other type, hereinafter termed the "large-angle" type, is employed on a fast moving guided missile, for example, a pilotless glider carrying a bomb, for automatically tracking a stationary or moving target, such as an enemy warship. In the small-angle system, the target is usually tracked manually under the control operator, and from a relatively fixed location, so that in any plane, for example, the E-plane, the angle of the cone or conical scan may be relatively small, say 9 degrees (+4.5 and —4.5 degrees), and the two switching beams or major lobes may each have a relatively small half-power width, for example, 4 degrees. Conical scanning antennas of this type are disclosed in the copending application of P. H. Smith Serial No. 498,622, filed August 14, 1943, now Patent No. 2,542,844, issued Feb. 20, 1951, and in the copending application of M. C. Biskeborn and A. G. Fox Serial No. 511,310, filed November 22, 1943, now Patent No. 2,429,601, issued October 28, 1947. In the large-angle system, a relatively wide cone angle, say ±9 degrees, and switching beams or major lobe patterns each having a half-power width in the order of 18 to 20 degrees are required, or at least highly desirable, in order to insure successful tracking of the target, despite movement of the target and slight momentary changes in the heading of the pilotless glider.

In the small-angle or anti-aircraft type of conically scanning antenna system, ambiguous indications resulting from false crossovers of the two switching patterns ordinarily do not completely impair the radar operation, since the system is under control of an operator and, in general, only an indication of direction is desired. On the other hand, in the large-angle or guided missile antenna systems heretofore proposed, the real or desired lobe crossover point, or "notch," in at least one of the two switching planes, is often of relatively low intensity and, consequently, the intensities of some of the on-target echo pulses are not always of proper value for controlling the glider steering mechanism. Moreover, minor lobe crossovers in directions making angles less than ±60 degrees with the scanning cone axis, which is coincident with the longitudinal axis of the pilotless glider, are obtained. These minor lobe reversals or false crossovers are detrimental since the glider may be controlled by the equiamplitude echoes corresponding to a false crossover and may therefore assume an erroneous course.

It is one object of this invention to obtain a lobe-switching or conical scanning antenna system having a high gain and a wide unambiguous scanning angle.

It is another object of this invention to prevent, in a lobe-switching antenna system, false crossovers of the two directive patterns in the switching plane.

It is another object of this invention to secure, in a conical scanning antenna system, unambiguous transceiving action over a conical scanning angle of at least 120 degrees.

It is another object of this invention to obtain, in a lobe-switching or conical scanning antenna system, a high real crossover point in both the E and H-planes, that is, a high gain along the cone axis.

It is another object of this invention to render, in a lobe-switching or conical scanning antenna system, the contours of the minor lobes and adjacent nulls of the two switching patterns substantially parallel.

It is another object of this invention to secure, in a large-angle dual-plane lobe-switching antenna system, equal or comparable equiamplitude on-target H-plane echo pulses and equiamplitude on-target E-plane echo pulses.

In accordance with one embodiment of the invention, the conical scanning antenna system comprises a paraboloidal main reflector having an aperture at its vertex, and a coaxial line connected to a radar transceiver and extending through the above-mentioned aperture. A dipole is positioned in front of the main reflector and connected to both conductors of the coaxial line and a cylindrical reflector is positioned in front of the dipole and attached to the outer conductor of the line. A passive linear antenna element, hereinafter termed a "deflector," is included between the main reflector and the dipole and supported by the outer coaxial line conductor. The axes of the main reflector and of the coaxial line are angularly related and means are provided for rotating the main reflector axis about the axis of the coaxial line, whereby conical rotation of the major lobe of the system obtains. The passive deflector and the front cylindrical reflector are each longer than the dipole. The linear deflector functions to render the contours of the corresponding minor lobes in the two E-plane patterns, and in the two H-plane patterns, substantially parallel. The cylindrical reflector functions to equalize the beam widths in the two planes and therefore to render the real crossover points in the two planes substantially equal.

The invention will be more fully understood from a perusal of the following specification taken in conjunction with the drawing, on which like reference characters denote elements of similar function and on which:

Figs. 1 and 2 are respectively a diagrammatic top view and a perspective view of one embodiment of the invention;

Figs. 3 and 4 are measured directive curves for the embodiment of Figs. 1 and 2;

Figs. 5 and 6 are measured directive curves, used herein for explaining the invention, for a prior art system; and Figs. 7 and 8 are explanatory curves useful in explaining the invention.

Referring to Figs. 1 and 2, reference numeral 1 denotes a paraboloidal reflector having an axis 2 and an aperture 3 at its vertex. The reflector 1 is supported by bolts 4 in the eccentric cup-shaped portion 5 of a gear plate 6. Numeral 7 denotes a large gear forming part of plate 6 and numeral 8 denotes a small gear which meshes with gear 7 and is driven by the motor 9 and shaft 10. Numeral 11 designates a stationary coaxial line comprising an inner conductor 12 and a outer conductor 13. The line 11 extends from the radar transceiver 14 through a central opening in plate 6 and through the aperture 3 in reflector 1; and its axis coincides with the axis 15 of the antenna system.

Reference numeral 16 denotes a primary antenna or active dipole comprising a pair of colinear elements 17 and 18 one of which is attached to both the inner and outer line conductors 12 and 13 and the other of which is conductively connected only to the outer line conductor 12. The overall length of the dipole 16 is about 0.45 wavelength, the design or mean operating wavelength being about 9.1 centimeters. A pair of diametrically opposite longitudinal slots 19 (only one shown) is provided in the outer conductor between the half-dipole elements 17, 18. Each slot 19 is critically dimensioned and constitutes a means for coupling the inner conductor 12 to the half-dipole member 17. Numeral 20 denotes a short-circuiting plug or end cap for rigidly attaching the inner conductor 12 to the outer conductor 13. The distance between the dipole 16 and the plug 20 is approximately a quarter-wavelength so that, as seen from the dipole, the end portion of line 11 constitutes a short-circuited quarter wave line and has a very high impedance. The combination of a slotted outer conductor and a dipole having both elements directly connected to the outer conductor, and the short-circuited quarter wave line arrangement for supporting the inner conductor, are well known in the art.

Reference numeral 21 denotes a cylindrical reflector which is rigidly attached to the outer line conductor 13 at a point in front of the dipole 16 and numeral 22 denotes a passive linear deflector member comprising two colinear elements 23, 24 attached to the outer line conductor 13 at a point in back of the dipole 16. The entire assembly is attached to the mobile glider by means of the supporting member 25, Fig. 2. In one embodiment constructed and tested at a mean or design wavelength of 9.1 centimeters, a paraboloidal reflector 1 having a diameter of about 3.35 wavelengths and a focal length of about one wavelength was employed. The length of the front reflector 21 was about 0.8 wavelength, its radius of curvature about 0.4 wavelength and its arc length in the order of a quadrant of a complete circle. The over-all lengths of the active dipole 16 and passive deflector 22 were, respectively, 0.45 and 0.55 wavelength. The front reflector 21 was positioned at a point in the order of 0.2 to 0.25 wavelength in front of the dipole 16 and the passive reflector 22 was positioned at a point about 0.35 wavelength in back of the dipole 16. The above values of the dimensions are given by way of example and are not to be taken as limiting values, since the value of each dimension may differ considerably from the value given.

In operation, with motor 9 energized, the paraboloidal reflector 1 is rotated so that its axis 2 revolves about the axis 15 of the coaxial line 11 and of the system, and describes a cone in space. In Fig. 1, the right and left extreme positions assumed by the reflector 1 and axis 2 in the horizontal plane during the eccentric rotation of reflector 1 are illustrated in full and broken lines, respectively. As the reflector 1 rotates, microwave pulsed energy is supplied by the transceiver 14 over line 11 to the dipole 16 and is then radiated towards the paraboloidal reflector 1, the passive deflector 22 and the cylindrical reflector 21. The waves impinging upon the front reflector 21 are redirected towards the dipole, and are therefore prevented from radiating in the forward direction. The resulting beam of the entire system makes an angle with the system axis 15, and, as reflector 1 rotates, the axis of the antenna beam or major lobe describes a cone in space whereby conical scanning is achieved. In reception, the converse operation obtains by virtue of the reciprocity theorem.

The echo pulses received from a reflective target are utilized to control the steering mechanism of the guided missile so as to maintain the guided missile directed towards the target. More particularly, dual-plane lobe-switching operation is used to maintain the cone antenna axis 15, which is aligned with the longitudinal axis of the missile, pointed at the target. Thus, with the missile headed towards the target, the echo pulses received with the reflector 1 in the "left" position and with the reflector 1 in the "right" position are equal, and the echo pulses received with the reflector successively in the "up" and "down" positions are also equal. Stated differently, with the axis 15 on target the real crossover point of the two major lobe patterns in the E or horizontal plane, and the real crossover point of the two major lobe patterns in the H or vertical plane, are aligned with the target direction. With the axis 15 off the target, the echo pulses in one or both lobe switching planes are unequal and the amplitude differences of the pulses are utilized to realign the axis 15 with the target. As is explained below in connection with Figs. 3 to 8, inclusive, the front reflector 21 functions to equalize the real crossover points in the two switching planes. The passive member 22 prevents, in the ±60-degree angle or sector α, Fig. 1, false crossovers of the two E-plane patterns, and false crossovers of the two H-plane patterns. In the prior art system mentioned above, in which the passive element is omitted, several high detrimental crossovers occur in the wide operating angular sector.

Referring to the measured directive patterns, Figs. 3, 4, 5 and 6, reference numerals 26 and 27, Fig. 3, denote the left and right H-plane patterns for the system of the invention illustrated by Figs. 1 and 2. The pattern 26 includes the major lobe 28, the first nulls 29, the first minor lobes 30 and the secondary minor lobe 31; and the pattern 27 includes the major lobe 32, the first nulls 33, the first minor lobes 34 and the secondary minor lobe 35. Numeral 36 designates the useful crossover point of the major lobes 28 and 32, ordinarily termed the "real" crossover point or "notch," and the dotted line 37 denotes the half-power point, corresponding to −3 decibels, of the major lobes 28, 32. Reference numerals 38 and 39, Fig. 4, denote the E-plane directive patterns for the system of the invention. The pattern 38 includes the major lobe 40, the first nulls 41, the first minor lobes 42 and the secondary lobe 43; and the pattern 39 includes the major lobe 44, the first nulls 45, the first minor lobes 46 and the secondary lobe 47. Numerals 48 and 49 denote, respectively, the real crossover point and half-power point of the major lobes 40 and 44. Numeral 50 denotes a reversal or false crossover, of the left first minor lobes 42 and 46, which occurs at +65 degrees, and numeral 51 designates a false crossover of the right first minor lobes 42 and 46, which occurs at −66 degrees.

Reference numerals 52 and 53, Fig. 5, denote the H-plane directive patterns for the prior-art system described above and comprising only a paraboloidal reflector, an active dipole and a front disk reflector. The pattern 52 includes the major lobe 54, the first nulls 55, the first minor lobes 56 and the secondary minor lobes 57; and the pattern 53 includes the major lobe 58, the first nulls 59, the first minor lobes 60 and the secondary minor lobes 61. Numerals 62 and 63 designate, respectively, the real crossover point and the half-power points of the major lobes 54 and 58. Reference numerals 64, 65, 66 and 67 denote false crossover points which occur at +57 degrees, +31 degrees, −30 degrees and −58 degrees, respectively. In Fig. 6, reference numerals 68 and 69 denote the E-plane directive patterns for the prior art system. The pattern 68 includes the major lobe 70, the nulls or dips 71 and the minor lobes 72; and the pattern 69 includes the major lobe 73, the nulls or dips 74 and the minor lobes 75. Numerals 76 and 77 designate, respectively, the crossover point and the half-power point for the major lobes 70 and 73. Numerals 78 and 79 denote the false crossover points which occur at +44 degrees and −42 degrees, respectively.

As may be seen from these curves, the real H-plane crossover point 36, Fig. 3, for the antenna of the invention, is relatively high as compared to the H-plane notch 62, Fig. 5, for the prior art antenna. The real H-plane and E-plane crossover points 36 and 48, Figs. 3 and 4, it will be noted, are of comparable intensities and about one and two decibels, respectively, above the half-power points 37 and 49, whereas the real crossover points 62 and 76, Figs. 5 and 6, for the prior art system with the disk reflector, are substantially different, the real H-plane and E-plane crossover points 62 and 76 being, respectively, about one and one-half decibels below and one decibel above the half-power point 63 and 77. In effect, the low H-plane notch value 62, Fig. 5, is raised to the high H-plane notch value 36, Fig. 3, by selecting a proper arc length for the front reflector 21.

Referring to the diagrams, Figs. 7 and 8, the two curves 80 and 81 of Fig. 7 and the two curves 82 and 83 of Fig. 8 represent one-half portion of two explanatory H-plane or E-plane lobe-switching patterns corresponding to the right or down half of the patterns of Figs. 3, 4, 5 and 6. The pattern 80 includes a central portion containing the major lobe 84 and a side portion 85 containing the nulls 86 and the minor lobes 87; the pattern 81 includes a major lobe 88 and a side portion 89 containing the nulls 90 and the minor lobes 91; the pattern 82 includes a major lobe 92 and a side portion 93 containing the nulls 94 and the minor lobes 95, and the pattern 83 includes a major lobe 96 and a side portion 97 containing the nulls 98 and the minor lobes 99. As shown in Fig. 7, the contours of the side portions 85 and 89 of patterns 80 and 81 are substantially parallel and, therefore, do not produce false crossovers, whereas in Fig. 8 the contours of side portions 93 and 97 of patterns 82 and 83 are in a sense diametrically opposite and, as a result, the several highly undesirable false crossovers 100, 101, 102, 103 and 104 are obtained. In short, Fig. 7 illustrates the optimum relation, whereas Fig. 8 illustrates the worst condition, of the contours of the side portions of the two lobe-switching patterns.

Considering the H-plane patterns 26 and 27, Fig. 3, for the antenna of the invention, it will be observed that the left or right side portion of pattern 26 containing the nulls 29 and the minor lobes 30, 31 and the corresponding left or right portion of pattern 27 containing the nulls 33 and the minor lobes 34, 35 do not, as in the optimum condition, Fig. 7, intersect at all; and the disposition of these corresponding left or right side portions reasonably approximates the ideal parallel condition. Similarly, considering the E-plane patterns 38 and 39, Fig. 4, for the system of the invention, the contours of the corresponding left or right side portions of these two patterns are, in the region of the null and first minor lobe, fairly parallel and the only reversals occur at plus 65 degrees and minus 66 degrees. In particular, it should be noted that, by reason of the action of the long passive deflector member 22 utilized in accordance with the invention, false crossovers are avoided in the wide 120-degree operating sector α, Fig. 1, in both the H-plane and the E-plane.

In contrast, considering the H-plane patterns 52 and 53, Fig. 5, for the prior art system, the corresponding left or right side portions of these patterns have opposing contours, that is, the corresponding minor lobes are greatly displaced and, in the ±60-degree operating sector α, the four reversals 64, 65, 66 and 67 are obtained. Since the false crossovers 64 and 67 are at about −17 decibels and the real crossover 62 at about −4.5 decibels, these two false crossovers have intensities only about 13.5 decibels below that of the real crossover 62 and are, therefore, particularly detrimental. While the false crossovers 65 and 66 are at about −21 decibels and, therefore, of lower intensity than that of the false crossovers 64 and 67, the crossovers 65 and 66 occur at the close angles of +31 degrees and −30 degrees, respectively, and are therefore also highly detrimental.

The E-plane patterns 68 and 69, Fig. 6, for the prior art system are also unsatisfactory inasmuch as the disposition of the corresponding side portions of these patterns deviates considerably from the optimum parallel condition. The false crossovers 78 and 79 obtained have the angular directions +44 and −42 degrees, respectively, which are included in the ±60-degree sector α; and the intensities of these false crossovers are only about 20 decibels below the real crossover 76. As previously explained, any one of the false crossovers 64, 65, 66 and 67, Fig. 5, and 78 or 79, Fig. 6, may produce false control currents, and hence cause the guided missile to assume an erroneous course and miss the target.

It is thus apparent that, in accordance with the invention, optimum on-target illumination is secured in both the H and E planes and, in each plane, a highly desirable or optimum disposition of the side portions of the two switching patterns is obtained.

Although the invention has been explained in connection with a particular embodiment it should be understood that it is not to be limited to the particular embodiment described inasmuch as other apparatus may be employed in successfully practicing the invention.

What is claimed is:

1. In a dual-plane lobe switching antenna system, a translation device, a paraboloidal main reflector having an aperture at its vertex, a stationary coaxial line connected to said device and extending through said aperture, the axes of said main reflector and line intersecting at said vertex, means for conically rotating the reflector axis about the line axis, said line comprising an inner conductor and an outer conductor, a circular cylindrical reflector facing said main reflector, an active linear antenna member included between said reflectors and connected to both line conductors, and a passive linear antenna member included between said main reflector and said active member and connected only to said outer line conductor, said linear members and said cylindrical reflector having parallel longitudinal axes and different length dimensions.

2. A combination in accordance with claim 1, the length of said passive member being respectively greater and smaller than the lengths of said active member and said cylindrical reflector.

3. In combination, a paraboloidal main reflector having an axis and an aperture at its vertex, a coaxial line extending through said aperture and comprising an inner conductor and an outer conductor, a cylindrical reflector attached to said outer conductor and facing said main reflector, a dipole positioned between said reflectors and connected to both of said conductors, a linear antenna element positioned between said dipole and main reflector and attached to said outer conductor and means for conically rotating the axis of said main reflector about the axis of said line.

References Cited in the file of this patent

UNITED STATES PATENTS

| | | |
|---|---|---|
| 1,745,342 | Yagi | Jan. 28, 1930 |
| 1,934,078 | Ludenia | Nov. 7, 1933 |
| 1,938,066 | Darbord | Dec. 5, 1933 |
| 2,083,242 | Runge | June 8, 1937 |
| 2,118,419 | Scharlou | May 24, 1938 |
| 2,342,721 | Boerner | Feb. 29, 1944 |
| 2,370,053 | Lindenblad | Feb. 20, 1945 |